United States Patent Office 3,664,639
Patented May 23, 1972

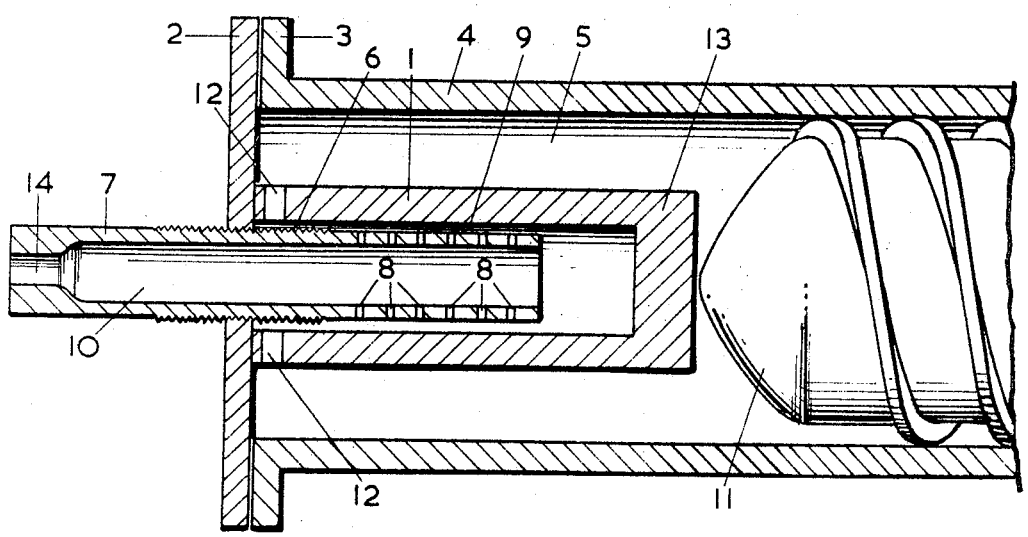

3,664,639
MIXING DEVICE
David Robin Lander, Welwyn Garden City, England, assignor to Imperial Chemical Industries Limited, London, England
Filed May 14, 1970, Ser. No. 37,187
Claims priority, application Great Britain, May 21, 1969, 25,863/69
Int. Cl. B01f 15/02
U.S. Cl. 259—4            11 Claims

ABSTRACT OF THE DISCLOSURE

A mixing device consisting of a sleeve and a hollow core which define a passageway; the sleeve and the core being movable in an axial direction with respect to each other to alter the length of the passageway; the material to be mixed being forced along the passageway under pressure and then through the centre of the core.

---

The present invention relates to improved mixing devices and in particular to mixing devices which can be used for homogenising thermoplastic materials especially mixing devices which can be fitted to the outlet end of extrusion machines.

Extrusion machines are frequently used for compounding thermoplastic materials with additives such as stabilisers, fillers or pigments and the thermoplastic is then subjected to conventional thermoplastic fabrication techniques. It is necessary to ensure uniformity in the properties of the finished article and therefore the additive should be thoroughly mixed with the thermoplastic material. The kneading action of the screw of an extrusion machine subjects the thermoplastic material to a mixing action. However if there is an agglomeration of the additive in the machine, this agglomeration tends to be carried through the machine and is not broken up because the material is not subjected to a sufficient shear action within the extruder. It is current practice therefore to pass the material emerging from the extruder through a mixing device which is generally independently driven and also an expensive piece of apparatus.

An object of the present invention is to provide a relatively simple mixing device which may readily be fitted to the end of an extruder and in which the mixing may be effected by the force exerted on the thermoplastic material by the screw of the extruder.

According to the present invention we provide a mixing device through which material will flow under pressure and wherein the material may be subjected to a controlled amount of shear said mixing device comprising a sleeve closed at one end and a hollow core member defining a passageway therebetween, the core and the sleeve being relatively movable in an axial direction so as to alter the length of said passageway, whereby the material is constrained so as to flow along the passageway and then through the hollow centre of the core member.

In our preferred embodiment the mixing device is fitted to the outlet end of an extrusion machine and the material is forced to flow through the mixing device by the forces urging the material through the extruder. We also prefer that the material should flow along the passageway between the sleeve and the core member in the opposite direction to that in which it is being carried along the extruder. In this way the mixing action is increased by forcing the direction of flow of the material to turn through 180°. Similarly, after the material has flown along the passageway between the core and the sleeve its direction is turned through 180° so that it then flows back along the hollow centre of the core.

To cause further turbulence in the material flowing through the mixing device, the walls of the hollow core member may be perforated so that some of the material flowing along the passageway between the core and the sleeve will pass through the perforations into the hollow centre of the core. Similarly, if as is preferred the material flows along the passageway in countercurrent to the direction in which it is flowing along the extruder, the sleeve which divides the passageway from the flow at the end of the extruder may also be perforated at various points along its length. In a further embodiment the sleeve and the hollow core member may be rotatable relative to each other so that the material flowing along the channel formed between the sleeve and the core will be subjected to further mixing due to the relative rotation of the two parts. The core, the sleeve or both may be rotatable as is convenient but in our preferred mixing device the core is rotatable and may be driven by the rotation of the extruder screw.

The hollow core member and the sleeve are movable relative to each other in an axial direction so as to allow the length of the passageway therebetween to be varied. If the core is not rotated to improve the mixing action, the core member which is slidable within the sleeve in our preferred mixing device may conveniently be screw threaded within the sleeve so that its position within the sleeve may be altered by rotation of the core. The preferred width of the passageway between the core and the sleeve will depend upon the nature of the material that is being mixed and the degree of mixing that is required. These factors contribute to the mixing in two ways because the longer the passageway and the narrower the passageway the greater the mixing within the passageway and also the greater the back pressure on the material being fed to the mixer. Thus, if the material is being fed by an extruder the greater the back pressure on the material the greater the mixing action to which the material is subjected within the extruder. On the other hand, the passageway should not be too narrow or too long because it will tend to become blocked or a back pressure too great for the forces driving the extruder will be created. The sleeve must be closed at the end towards which the polymer in the passageway is flowing and there must be a channel at or near the end of the hollow core to allow the material to flow from the passageway into the hollow centre of the core.

A mixing device of the present invention may readily be fitted to the outlet end of an extruder to improve the homogeneity of the material being extruded. This is particularly useful for ensuring that any additives which are incorporated in the material are uniformly dispersed therethrough and in particular for causing breakdown of agglomerates. The mixing devices are especially useful to ensure that pigments or dyes are evenly dispersed through thermoplastic materials; in particular the mixing devices may be used in conjunction with a system in which pigments or dyes are injected into a thermoplastic material as it is being carried along the barrel of an extruder.

The present invention is illustrated but in no way limited by reference to the accompanying drawing which illustrates a mixing device fitted to the outlet end of a screw extruder.

The mixing device consists of a sleeve 1 which is attached to a plate 2. The plate 2 is so constructed that it can be bolted (the bolts are not shown) to a flange 3 formed at the end of the barrel of the extruder 4. When the plate 2 is bolted to the flange the sleeve 1 extends within the barrel 4 thus defining a channel 5 between the barrel and the sleeve. A screw threaded hole 6 is formed at the centre of the plate 2 into which can be screwed the hollow core member 7 which is screw threaded along a length of its outer surface so that its position within the sleeve can be altered. A part of the length of the core member that resides within the sleeve is provided with a series of perforations 8 to allow material to flow from the passageway 9 between the sleeve and the core into the hollow centre 10 of the core member 7.

In operation the material is forced along the channel 5 by the rotation of the screw 11 of the extruder. When the material reaches the plate 2 it is forced to flow through the opening 12 formed in the wall of the sleeve 1 and then flows back along the passageway 9. Some material flowing in passageway 9 will flow through the perforations 8 whereas some will travel the whole length of the passageway 9 and will then be forced by the closed end 13 of the sleeve 1 to flow back along the hollow centre 10 of the core member 7. Thus, all the material will finally emerge from the mixer out of the orifice 14 at the end of the core member 7.

I claim:

1. A mixing device through which material will flow under pressure and wherein the material may be subjected to an adjustably controlled amount of shear and mixing device comprising a sleeve closed at one end and a hollow core member defining a passageway therebetween, the core and the sleeve being adjustably relatively movable in an axial direction so as to vary the length of said passageway whereby material is constrained so as to flow along the passageway and then through the hollow centre of the core member.

2. A mixing device according to claim 1 wherein the hollow core member is perforated.

3. In combination a screw extruder and a mixing device as claimed in claim 2.

4. A mixing device according to claim 1 wherein the sleeve and the core are relatively rotatable.

5. In combination a screw extruder and a mixing device as claimed in claim 4.

6. In combination a screw extruder and a mixing device as claimed in claim 1.

7. A combination as claimed in claim 6 wherein the mixing device is located at the outlet end of the screw extruder.

8. A combination according to claim 7 in which the sleeve is provided with an opening at a point remote from the closed end of the sleeve and the end of the extruder screw such that material is constrained to flow along the passageway in a direction opposite to that in which it is carried through the extruder.

9. A combination according to claim 6 wherein the sleeve is perforated.

10. A mixing device comprising outer tubular sleeve means having an inlet end and a closed end, and an inner tubular member disposed within the outer sleeve means so as to define a passageway therewith, the inner tubular member having an inlet end disposed near the closed end of the sleeve means and an outlet end remote from the closed end of the sleeve means, and means for adjusting the relative axial positions of the tubular member and the sleeve means.

11. The mixing device of claim 10 in combination with a screw extruder having an outlet end, said mixing device being attached to said extruder such that the inlet end of said sleeve means is in communication with the outlet end of the extruder.

References Cited

UNITED STATES PATENTS

| 1,140,548 | 5/1915 | Vogelsang | 259—11 |
| 3,263,966 | 8/1966 | Breer | 259—4 |
| 3,402,916 | 9/1968 | Kates | 259—4 |

ROBERT W. JENKINS, Primary Examiner